(12) United States Patent
Miura

(10) Patent No.: US 10,953,826 B1
(45) Date of Patent: Mar. 23, 2021

(54) VEHICULAR SHOCK-ABSORBING MEMBER

(71) Applicant: TOYOTA SHATAI KABUSHIKI KAISHA, Kariya (JP)

(72) Inventor: Toshihisa Miura, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 74 days.

(21) Appl. No.: 16/496,448

(22) PCT Filed: Dec. 5, 2017

(86) PCT No.: PCT/JP2017/043546
§ 371 (c)(1),
(2) Date: Sep. 22, 2019

(87) PCT Pub. No.: WO2018/173377
PCT Pub. Date: Sep. 27, 2018

(30) Foreign Application Priority Data

Mar. 23, 2017 (JP) .............................. JP2017-057474

(51) Int. Cl.
*B60R 19/03* (2006.01)
*B60R 19/18* (2006.01)
(52) U.S. Cl.
CPC .............. *B60R 19/03* (2013.01); *B60R 19/18* (2013.01); *B60R 2019/1806* (2013.01)
(58) Field of Classification Search
CPC .. B60R 19/03; B60R 19/18; B60R 2019/1806
USPC ........................................................ 293/102
See application file for complete search history.

(56) References Cited

U.S. PATENT DOCUMENTS

| 4,671,550 | A | 6/1987 | Molnar |
| 6,062,632 | A | 5/2000 | Brachos et al. |
| 8,684,427 | B2 * | 4/2014 | Marur .................... F16F 7/003 |
| | | | 293/102 |
| 8,936,285 | B2 * | 1/2015 | Inoue ...................... B60R 19/18 |
| | | | 293/132 |
| 10,501,036 | B2 * | 12/2019 | Takayanagi ............. B60R 19/18 |
| 2004/0174024 | A1 | 9/2004 | Murata et al. |

FOREIGN PATENT DOCUMENTS

| JP | 2004-322861 A | 11/2004 |
| JP | 2015-182560 A | 10/2015 |

* cited by examiner

*Primary Examiner* — Pinel E Romain
(74) *Attorney, Agent, or Firm* — Christensen, Fonder, Dardi & Herbert PLLC

(57) ABSTRACT

A vehicular shock-absorbing member may include a pair of upper and lower supporting wood members configured such that outer surfaces thereof function as load input surfaces in which a collision load is received and that axes of annual rings thereof extend along the load input surfaces, and shock-absorbing wood member sandwiched between the supporting wood members in such a manner that an axis of annual rings thereof extends in a direction perpendicular to the load input surfaces of the supporting wood members. The shock-absorbing wood member is configured such that a load input surface thereof in which the collision load is received is displaced inward relative to the load input surfaces of the supporting wood members.

7 Claims, 6 Drawing Sheets

VEHICULAR SHOCK-ABSORBING MEMBER

CROSS-REFERENCE TO RELATED APPLICATIONS

The present application is a 35 U.S.C. § 371 National Phase entry of, and claims priority to, PCT Application No. PCT/JP2017/043546, filed Dec. 5, 2017, which in turn claims priority to Japanese Patent Application No. 2017-057474, filed Mar. 23, 2017, both of which are hereby incorporated herein by reference in their entireties for all purposes.

BACKGROUND

The disclosure relates to a vehicular shock-absorbing member configured to absorb a collision load applied to a vehicle by utilizing collapse of wood.

Art relating to a vehicular shock-absorbing member described above is described in JP2015-182560A. As shown in FIG. 12, a shock-absorbing member 100 described in JP2015-182560A is composed of a rectangular columnar shaped-wood member 102 and an outer cylindrical member 104 that receives the wood member 102 therein. The wood member 102 is received in the outer cylindrical member 104 with an axial direction of annual rings thereof aligned with an axial direction of the outer cylindrical member 104. When a collision load F generated in the event of a vehicle collision is axially applied to the wood member 102 and the outer cylindrical member 104, both of the wood member 102 and the outer cylindrical member 104 are axially crushed, an impact due to the vehicle collision may be absorbed.

The shock-absorbing member 100 described above is configured to receive the collision load F at axially one end of the wood member 102 or other member. That is, in the shock-absorbing member 100, a load receiving surface into which the collision load F can be input is small in area. Therefore, for example, in a situation where a collision position is localized, e.g., where a vehicle collides with a power pole, the shock-absorbing member 100 cannot often provide its inherent shock-absorbing performance.

Thus, there is a need in the art to provide an improved shock-absorbing member.

SUMMARY

In a first aspect of the disclosure, a vehicular shock-absorbing member configured to absorb a collision load applied to a vehicle by utilizing deformation of wood may include a pair of upper and lower supporting wood members positioned on an end periphery of a vehicle body in a beam shape and configured such that outer surfaces thereof function as load input surfaces in which the collision load is received and that axes of annual rings thereof extend along the load input surfaces, and a shock-absorbing wood member arranged over a range from one end to the other end of the pair of upper and lower supporting wood members in their longitudinal direction and sandwiched between the supporting wood members in such a manner that an axis of annual rings thereof extends in a direction perpendicular to the load input surfaces of the supporting wood members. The shock-absorbing wood member is configured such that a load input surface thereof in which the collision load is received is flush with the load input surfaces of the supporting wood members or displaced inward relative to the load input surfaces of the supporting wood members.

According to the aspect, the pair of upper and lower supporting wood members are positioned on the end periphery of the vehicle body in a beam shape and are configured such that the outer surfaces thereof function as the load input surfaces in which the collision load is received. Further, the shock-absorbing wood member is arranged over a range from one end to the other end of the pair of upper and lower supporting wood members in their longitudinal direction and is sandwiched between the supporting wood members. Further, the load input surface of the shock-absorbing wood member is flush with the load input surfaces of the supporting wood members or displaced inward relative to the load input surfaces of the supporting wood members. Thus, the load input surfaces in which the collision load is received may span a wide area. As a result, the collision load can be received over a wide area. Therefore, even in a situation where a collision position is localized, e.g., where the vehicle collides with a power pole, the collision load can be reliably absorbed. Further, the axis of the annual rings of the shock-absorbing wood member may extend in the direction perpendicular to the load input surfaces of the supporting wood members, i.e., in a possible input direction of the collision load. Therefore, the relatively large collision load can be absorbed due to collapse of the shock-absorbing wood member. Further, the shock-absorbing wood member is vertically sandwiched between and held by the pair of supporting wood members of which the axes of the annual rings extend along the load input surfaces. Thus, the shock-absorbing wood member can be held by the pair of upper and lower supporting wood members with a large force.

In a second aspect of the disclosure, a plurality of rectangular columnar-shaped shock-absorbing wood members are sandwiched between the pair of upper and lower supporting wood members in a laterally aligned condition. Therefore, short columnar-shaped wood members may be effectively used.

In a third aspect of the disclosure, the load input surface of the shock-absorbing wood member is displaced inward relative to the load input surfaces of the supporting wood members by a predetermined dimension. Therefore, the collision load may be first input to the load input surfaces of the pair of upper and lower supporting wood members, so that the pair of supporting wood members may collapse, and then be input to the load input surface of the shock-absorbing wood member. After, the collision load is input to the load input surface of the shock-absorbing wood member, the shock-absorbing wood member may collapse with the pair of supporting wood members. Therefore, in an initial stage of input of the collision load, the load at which the wood members (the supporting wood members) start to collapse may be relatively small. Conversely, the load at which the wood members (the shock-absorbing wood member and the supporting wood members) start to collapse may be relatively large.

In a fourth aspect of the disclosure, the shock-absorbing wood member is sandwiched between and held by a pair of restraining wood members from both sides of the supporting wood members in the longitudinal direction. The restraining wood members respectively have annual rings of which axes are identical with the axes of the annual rings of the supporting wood members. Therefore, when the shock-absorbing wood member is collapsed in an axial direction of the annual rings due to the collision load, the shock-absorbing wood member may be effectively prevented from being deformed in a radial direction of the annual rings.

In a fifth aspect of the disclosure, the pair of restraining wood members respectively have depression surfaces continuous with the load input surface of the shock-absorbing wood member.

In a sixth aspect of the disclosure, the shock-absorbing wood member and the pair of upper and lower supporting wood members are configured to be attached to a bumper reinforcement member of the vehicle extending in a vehicle width direction. Therefore, the shock-absorbing member may absorb the collision load in a vehicle front-back direction.

In a seventh aspect of the disclosure, the shock-absorbing wood member and the pair of upper and lower supporting wood members are configured to be attached to each of rocker panels of the vehicle extending in a vehicle front-back direction. Therefore, the shock-absorbing member may absorb the collision load in a vehicle lateral direction.

DETAILED DESCRIPTION

Embodiment 1

Below, a shock-absorbing member according to Embodiment 1 of this disclosure will be described with reference to FIG. 1 to FIG. 11. The shock-absorbing member 20 according to this embodiment may be a member to reduce a collision load F applied to a vehicle 10 at the time of a vehicle frontal collision. Further, forward, backward, rightward, leftward, upward and downward directions described with reference to the figures may respectively correspond to forward, backward, rightward, leftward, upward and downward directions of the vehicle 10 to which the shock-absorbing member 20 is attached.

<Regarding the Outline of Front Structure of Vehicle 10>

Figure 1:
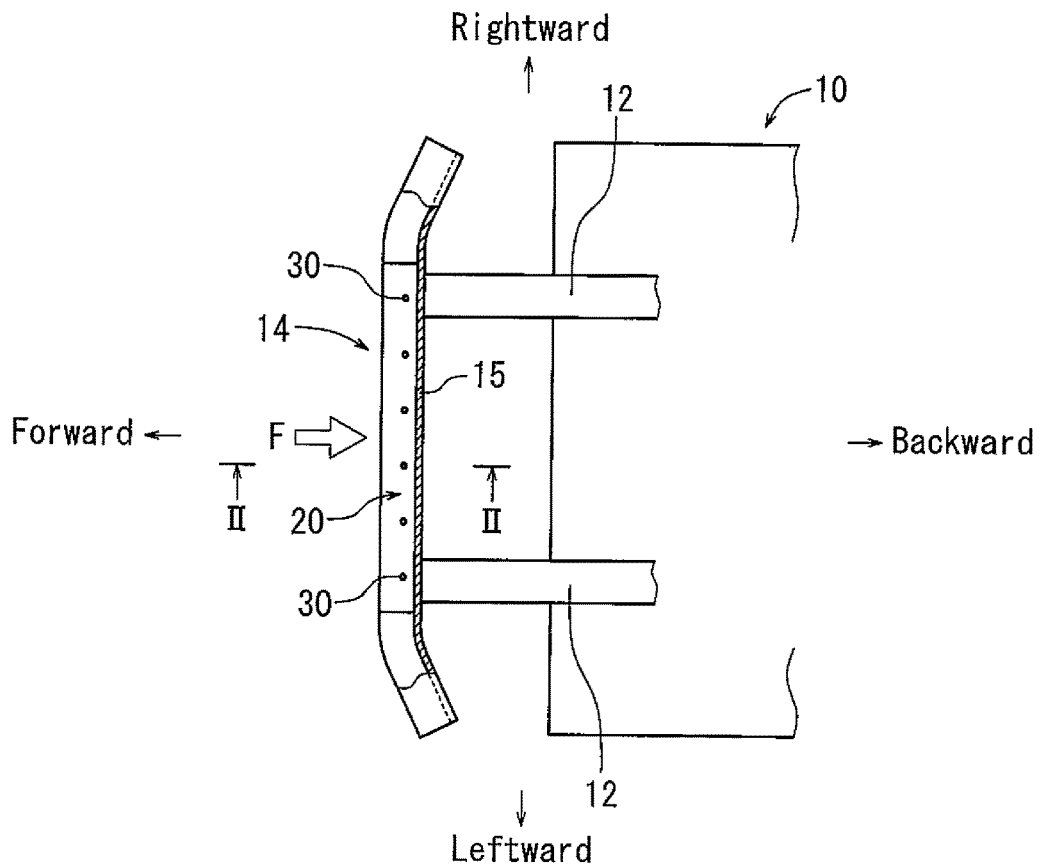
FIG. 1 is a schematic plan view of a vehicle front portion having a shock-absorbing member according to Embodiment 1 of the disclosure.
Figure 2:
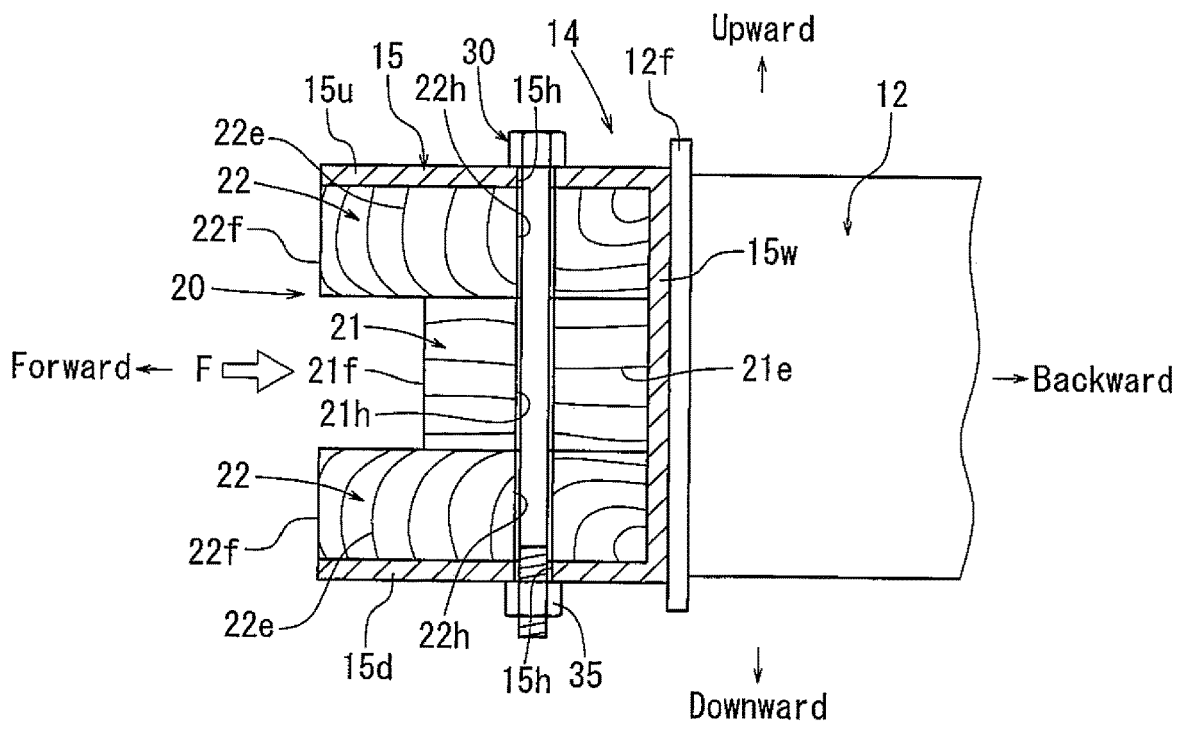
FIG. 2 is a vertical sectional view of a bumper reinforcement member to which the shock-absorbing member according to the embodiment is attached (a sectional view taken along line II-II of FIG. 1).

As shown in FIG. 1 and FIG. 2, the vehicle 10 may have side members 12 positioned on a front portion the vehicle 10. The side members 12 may be tubular framework members respectively positioned on right and left sides of the vehicle 10 and extending in a vehicle front-back direction. Further, the vehicle may have a front bumper 14 connected to front flanges 12f (FIG. 2) formed on the right and left side members 12 and extending in a vehicle width direction. The front bumper 14 may be composed of a bumper reinforcement member 15 connected to the side members 12, and a bumper cover (not shown) covering the bumper reinforcement member 15 and a cushioning material. The beam-shaped shock-absorbing member 20 may be attached to the bumper reinforcement member 15 of the front bumper 14. Further, the bumper reinforcement member 15 may be referred to as an end periphery of a vehicle body in this disclosure.

As shown in FIG. 2, the bumper reinforcement member 15 may be formed as a front-open rectangular channel-shaped member defined by an upper wall portion 15u, a vertical wall portion 15w, and a lower wall portion 15d. Further, the shock-absorbing member 20 may be received within a rectangular groove of the bumper reinforcement member 15. Further, the upper wall portion 15u and the lower wall portion 15d of the bumper reinforcement member 15 may respectively have bolt holes 15h formed thereon. The bolt holes 15h may be configured such that a bolt 30 may be inserted therethrough in order to secure the shock-absorbing member 20 to the bumper reinforcement member 15.

<Regarding the Shock-Absorbing Member 20>

Figure 3:
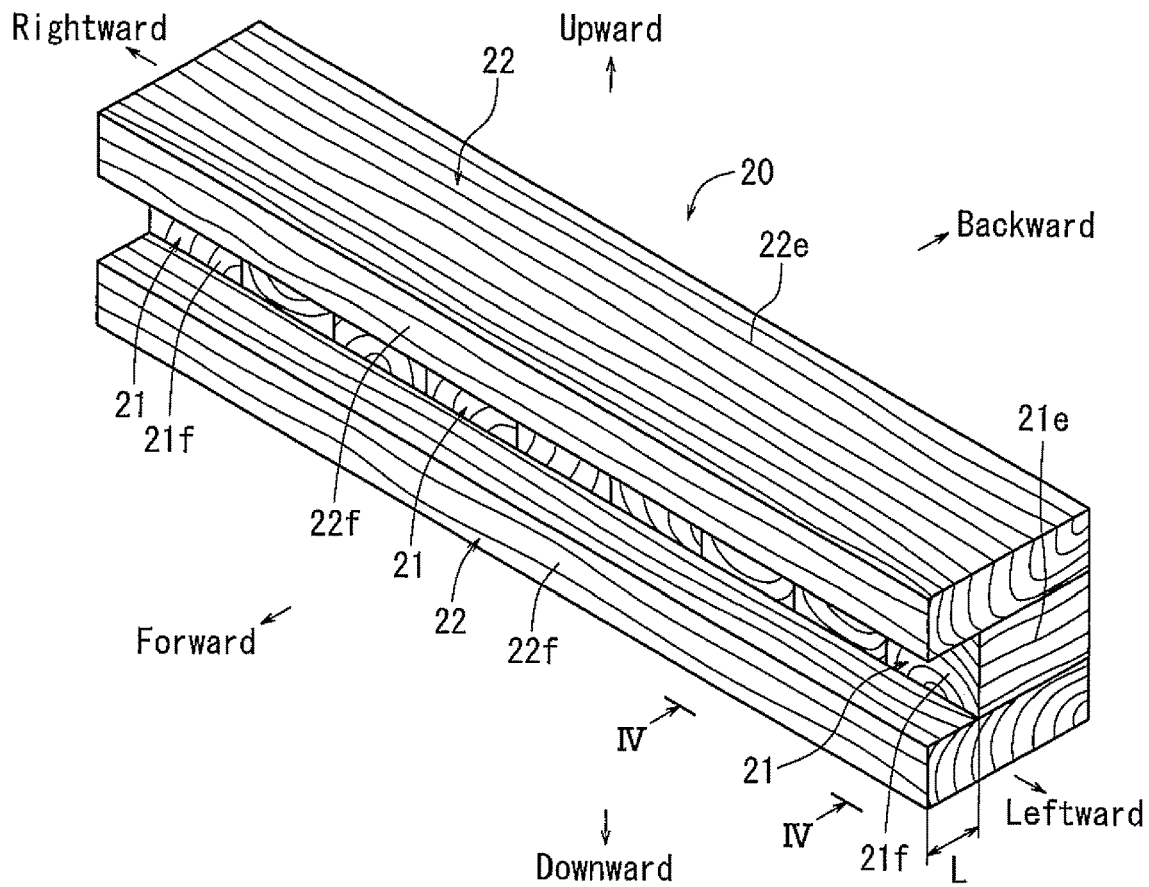
FIG. 3 is a schematic perspective view of the shock-absorbing member according to the embodiment.
Figure 4:
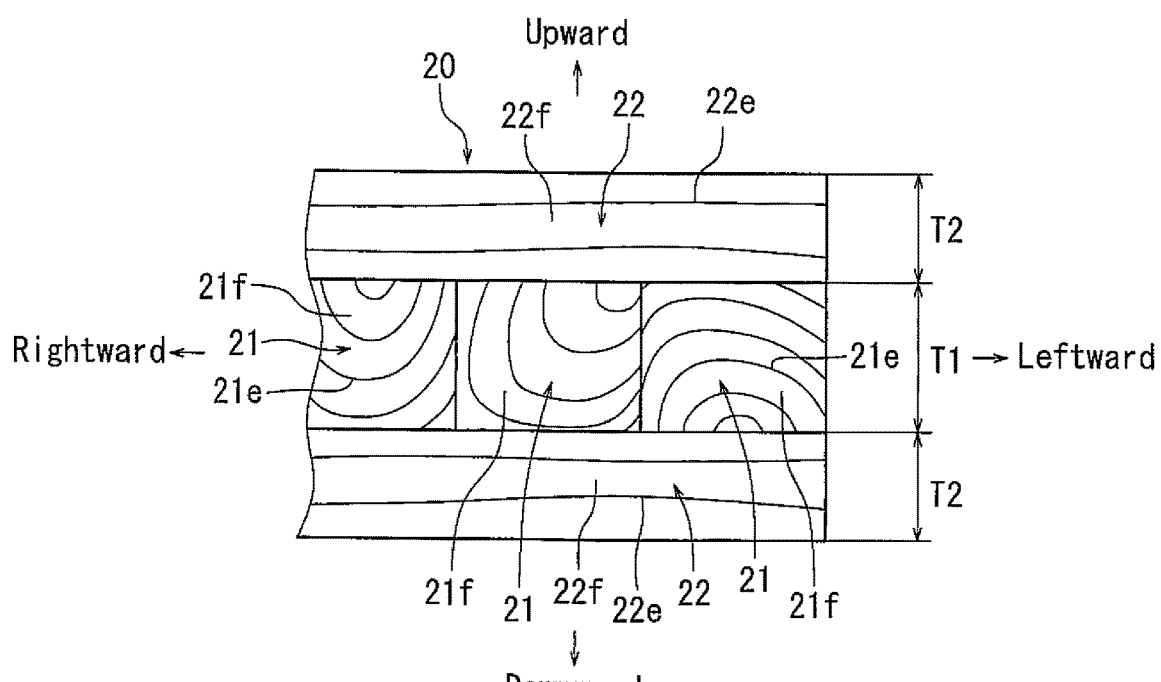
FIG. 4 is a partially elevational view of the shock-absorbing member (a view viewed from a direction of line IV-IV of FIG. 3).

The shock-absorbing member 20 may be a member to absorb the collision load F at the time of the vehicle frontal collision. As shown in FIG. 2 to FIG. 4, the shock-absorbing member 20 may be composed of a pair of upper and lower supporting wood members 22, and a large number of shock-absorbing wood members 21 sandwiched between and held by the pair of upper and lower supporting wood members 22. As shown in FIG. 3, the pair of upper and lower supporting wood members 22 may be beam-shaped thick wood plates having a predetermined width and configured such that axes of annual rings 22e thereof extend in their longitudinal direction (vehicle width direction (lateral direction)). Further, the pair of upper and lower supporting wood members 22 may respectively have widthwise front end surfaces that function as load input surfaces 22f in which the collision load F is received. Further, the supporting wood members 22 may preferably be formed by a needle leaf tree such as cedar or Japanese cypress.

The shock-absorbing wood members 21 of the shock-absorbing member 20 may be wood members configured to practically absorb the collision load F. As shown in FIG. 3 and FIG. 4, the shock-absorbing wood members 21 may be rectangular columnar-shaped wood members having a length smaller than a width of the supporting wood members 22 by a dimension L. Further, the shock-absorbing wood members 21 may respectively be positioned such that axes thereof extend in a direction perpendicular to the load input surfaces 22f of the supporting wood members 22, i.e., in the vehicle front-back direction. Further, the shock-absorbing wood members 21 may be configured such that axes of annual rings 21e thereof extend in the vehicle front-back direction along the axes of the shock-absorbing wood members 21.

As shown in FIG. 3 and FIG. 4, the large number of shock-absorbing wood members 21 may be arranged between the pair of upper and lower supporting wood members 22 in such a manner that they are laterally closely aligned with each other. Further, as shown in FIG. 3, the large number of shock-absorbing wood members 21 may be positioned such that rear end surfaces thereof are flush with widthwise rear end surfaces of the pair of upper and lower supporting wood members 22. That is, the large number of shock-absorbing wood members 21 may be positioned such that front end surfaces thereof are displaced inward relative to the load input surfaces 22f (the front end surfaces) of the pair of upper and lower supporting wood members 22 by the dimension L. Further, the front end surfaces of the large number of shock-absorbing wood members 21 may function as load input surfaces 21f in which the collision load F is received. Further, similar to the supporting wood members 22, the shock-absorbing wood members 21 may preferably be formed by a needle leaf tree such as cedar or Japanese cypress.

As shown in FIG. 2, the pair of upper and lower supporting wood members 22 and the large number of shock-absorbing wood members 21 may respectively have bolt holes 22h and 21h formed thereon and configured such that bolts 30 may be inserted thereinto. The bolt holes 22h and 21h may respectively be positioned so as to correspond to the bolt holes 15h formed on the upper wall portion 15u and the lower wall portion 15d of the bumper reinforcement member 15. Further, in FIG. 3 and FIG. 4, the bolt holes 21h and 22h of the shock-absorbing wood members 21 and the supporting wood members 22 may be omitted.

<Regarding Attachment of Shock-Absorbing Member 20>

In order to attach the shock-absorbing member 20 to the bumper reinforcement member 15, as shown in FIG. 3 and FIG. 4, the large number of shock-absorbing wood members 21 may be first bonded to each other, and then a combined body of the shock-absorbing wood members 21 may be bonded to the pair of upper and lower supporting wood members 22. Thereafter, the bolt holes 22h and 21h corresponding to the bolt holes 15h formed on the upper wall portion 15u and the lower wall portion 15d of the bumper reinforcement member 15 may respectively be formed on the supporting wood members 22 and the shock-absorbing wood members 21. Next, as shown in FIG. 2, the shock-absorbing member 20 thus formed may be positioned between the upper wall portion 15u and the lower wall portion 15d of the bumper reinforcement member 15. At this time, the shock-absorbing member 20 may be positioned such that the bolt holes 21h and 22h of the shock-absorbing wood members 21 and the supporting wood members 22 are aligned with the bolt holes 15h of the bumper reinforcement member 15 (the upper wall portion 15u and the lower wall portion 15d). Subsequently, the bolts 30 may be inserted into the bolt holes 15h, 21h and 22h and then be tightly fastened by nuts 35. Thus, the shock-absorbing member 20 may be attached to the bumper reinforcement member 15.

In this embodiment, the combined body of the shock-absorbing wood members 21 may be bonded to the pair of upper and lower supporting wood members 22. However, the combined body of the shock-absorbing wood members 21 may not necessarily be bonded to the pair of upper and lower supporting wood members 22. Further, the shock-absorbing wood members 21 may be formed into the combined body using a fitting structure instead of forming the combined body of the shock-absorbing wood members 21 by bonding. In addition, when the number of the shock-absorbing wood members 21 is small, the shock-absorbing wood members 21 may not necessarily be formed into the combined body by bonding or fitting. That is, the shock-absorbing wood members 21 may be secured to each other only by fastening forces of the bolts 30 and the nuts 35.

<Regarding the Action of the Shock-Absorbing Member 20>

Figure 5:
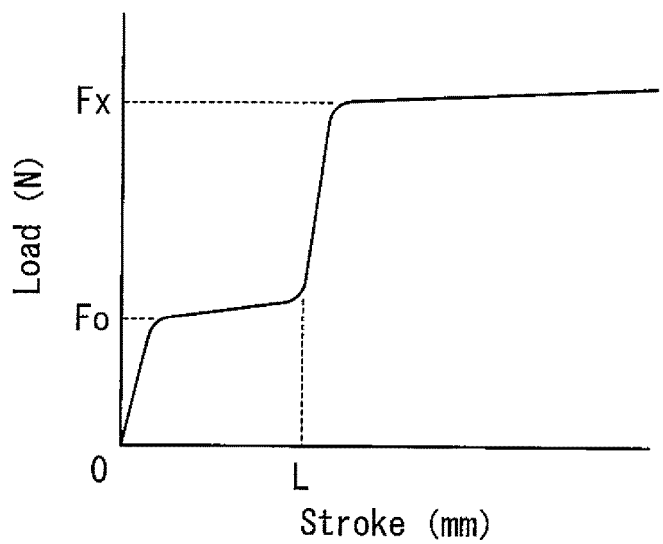
FIG. 5 is a graph illustrating a relationship between a load applied to the shock-absorbing member and a deformation amount (stroke).

Next, action of the shock-absorbing member 20 will be described with reference to FIG. 5. Further, in FIG. 5, a horizontal axis shows an amount of collapse (stroke) of the shock-absorbing member 20 at the time when the collision load F is applied thereto. Conversely, a vertical axis shows a magnitude of the load at the time when the shock-absorbing member 20 is collapsed.

For example, when the vehicle 10 collides with a power pole or other object from before, the collision load F may be first input to the load input surfaces 22f of the pair of upper and lower supporting wood members 22 of the shock-absorbing member 20. Further, the axes of the annual rings 22e of the supporting wood members 22 may extend along the load input surfaces 22f. Therefore, a critical load F0 at which the supporting wood members 22 start to collapse may be relatively small. As shown in FIG. 5, in an initial stage of input of the collision load F, the supporting wood members 22 may collapse in their width direction (the vehicle front-back direction) after the collision load F exceeds the critical load F0 of the pair of upper and lower supporting wood members 22.

Thereafter, when the pair of upper and lower supporting wood members 22 collapse by the dimension L, the collision load F may be input to the load input surfaces 21f of the shock-absorbing wood members 21. As described above, the axes of the annual rings 21e of the shock-absorbing wood members 21 may extend in the vehicle front-back direction. Therefore, a critical load Fx at which the shock-absorbing wood members 21 start to collapse may be much greater than the critical load F0 at which the supporting wood members 22 start to collapse. Further, after the collision load F exceeds the critical load Fx of the shock-absorbing wood members 21, the shock-absorbing wood members 21 may collapse in their width direction (the vehicle front-back direction) with the supporting wood members 22. Thus, both of the shock-absorbing wood members 21 and the supporting wood members 22 may collapse, so that the collision load F may be absorbed.

Further, the critical load F0 at which the pair of upper and lower supporting wood members 22 start to collapse may be controlled by increasing or reducing a thickness T2 (FIG. 4) of each of the supporting wood members 22. Similarly, the critical load Fx at which the shock-absorbing wood members 21 start to collapse may be controlled by increasing or reducing a thickness T1 of each of the shock-absorbing wood members 21.

<Advantage of the Shock-Absorbing Member 20 of the Embodiment>

According to the shock-absorbing member 20 of this embodiment, the pair of upper and lower supporting wood members 22 may be positioned on the bumper reinforcement member 15 (the end periphery of the vehicle body) in a beam shape such that the front end surfaces (outer-side surfaces) thereof may function as the load input surfaces 22f in which the collision load F is received. Further, the shock-absorbing wood members 21 may be sandwiched between the pair of upper and lower supporting wood members 22 in such a manner that they are arranged over a range from one end to the other end of the pair of upper and lower supporting wood members 22 in the longitudinal direction. Further, the load input surfaces 21f of the shock-absorbing wood members 21 may be positioned inward relative to the outer-side surfaces (the load input surfaces 22f) of the supporting wood members 22. Thus, the load input surfaces 21f and the load input surfaces 22f in which the collision load F is received may be spread over a wide area, so that the collision load F can be received in such a wide area. Therefore, even in a situation where a collision position is localized, e.g., where the vehicle 10 collides with the power pole, the collision load F can be reliably absorbed.

Further, the axes of the annual rings 21e of the shock-absorbing wood members 21 may extend in the direction perpendicular to the load input surfaces 22f of the supporting wood members 22, i.e., in a possible input direction of the collision load F. Therefore, the relatively large collision load F can be absorbed due to collapse of the shock-absorbing wood members 21. Further, the shock-absorbing wood members 21 may be vertically sandwiched between and held by the pair of supporting wood members 22 configured such that the axes of the annual rings 22e extend along the load input surfaces 22f. Thus, the shock-absorbing wood members 21 can be held by the pair of upper and lower supporting wood members 22 with a large force. Further, the shock-absorbing member 20 may be made of wood. Therefore, the shock-absorbing member 20 may be reduced in weight relative to a shock-absorbing member made of lightweight metals or other various materials and having the same load absorbing capacity.

Modified Embodiment 1

Figure 6:
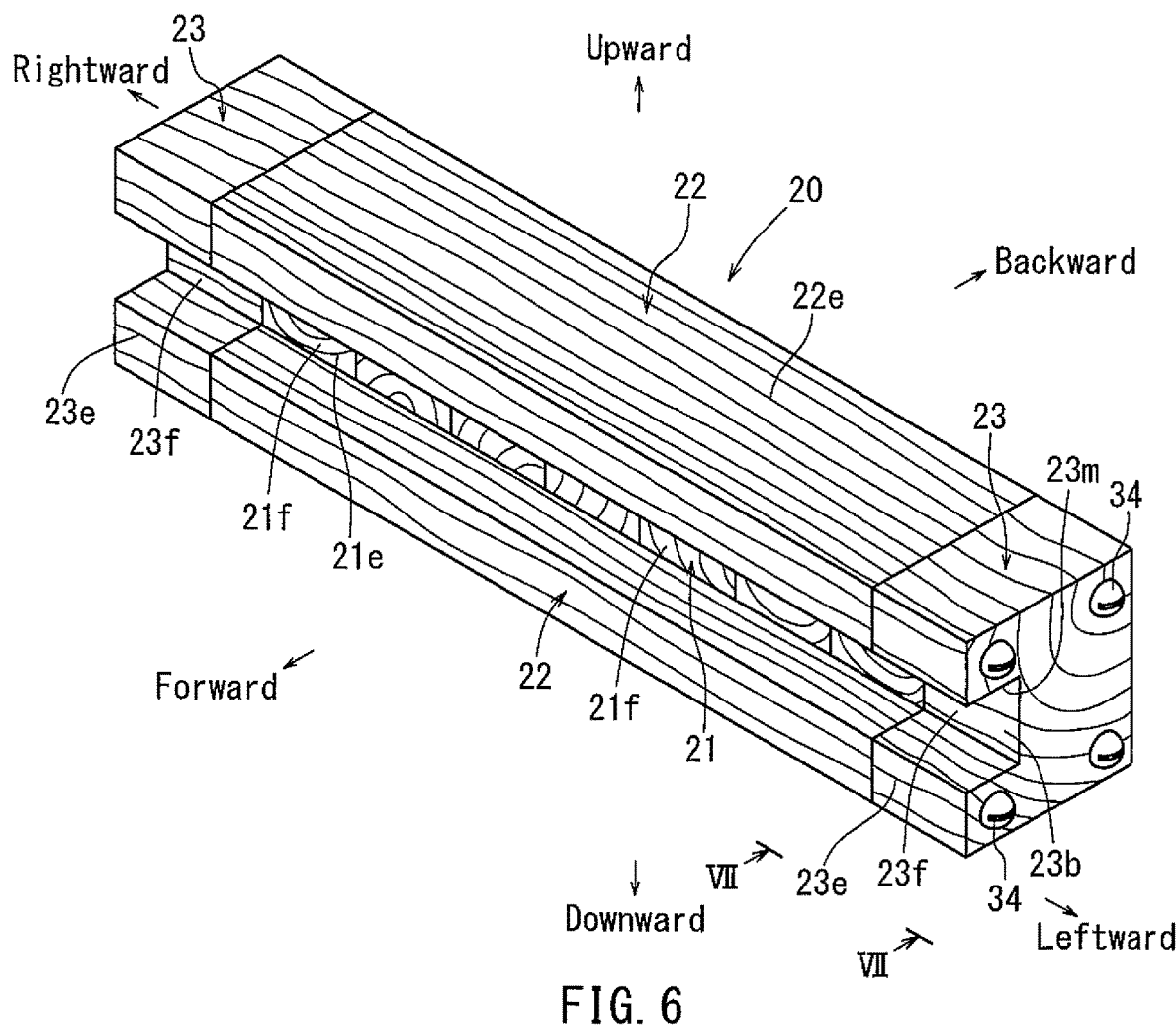
FIG. 6 is a schematic perspective view of a shock-absorbing member according to a Modified Embodiment 1.
Figure 7:
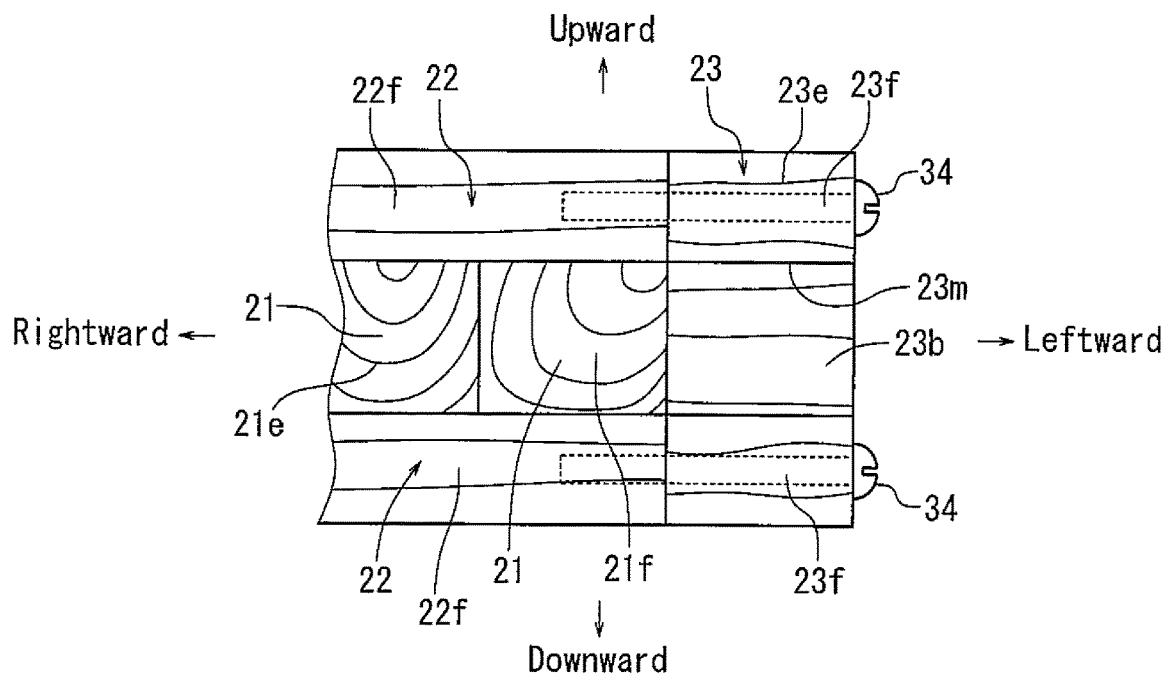
FIG. 7 is a partially elevational view of the shock-absorbing member according to a Modified Embodiment 1 (a view viewed from a direction of line VII-VII of FIG. 6).

The embodiment described above can be changed or modified without departing from the scope of the disclosure. For example, in the embodiment, the large number of shock-absorbing wood members 21 may be sandwiched between and held by the pair of upper and lower supporting wood members 22. However, as shown in FIG. 6 and FIG. 7, a pair of right and left restraining wood members 23 may be used in addition to the pair of upper and lower supporting wood members 22, so that the large number of shock-absorbing wood members 21 are additionally laterally sandwiched between and held by the restraining wood members 23. In such a case, similar to the pair of upper and lower supporting wood members 22, the right and left restraining wood members 23 may be configured such that axes of annual rings 23e thereof extend along their load input surfaces 23f. Further, the pair of right and left restraining wood members 23 may respectively have rectangular grooves 23m formed on front portions thereof and configured to correspond to a positional relationship of the load input surfaces 22f of the pair of upper and lower supporting wood members 22 and the load input surfaces 21f of the shock-absorbing wood members 21.

Further, the restraining wood members 23 may be positioned such that bottom surfaces 23b of the rectangular grooves 23m are flush with the load input surfaces 21f of the shock-absorbing wood members 21. As shown in FIG. 7 and other figures, the pair of right and left restraining wood members 23 thus positioned may be secured to the pair of upper and lower supporting wood members 22 by wood screws 34 or other such devices. Further, the bottom surfaces 23b of the rectangular grooves 23m formed on the restraining wood members 23 may be referred to as depression surfaces. Thus, the large number of shock-absorbing wood members 21 may be laterally sandwiched between and held by the pair of right and left restraining wood members 23 in addition to the pair of upper and lower supporting wood members 22. As a result, when the shock-absorbing wood members 21 are collapsed in axial directions of the annual rings 21e due to the collision load F, the shock-absorbing wood members 21 may be effectively prevented from being deformed in radial directions of the annual rings 21e.

Modified Embodiment 2

Figure 8:
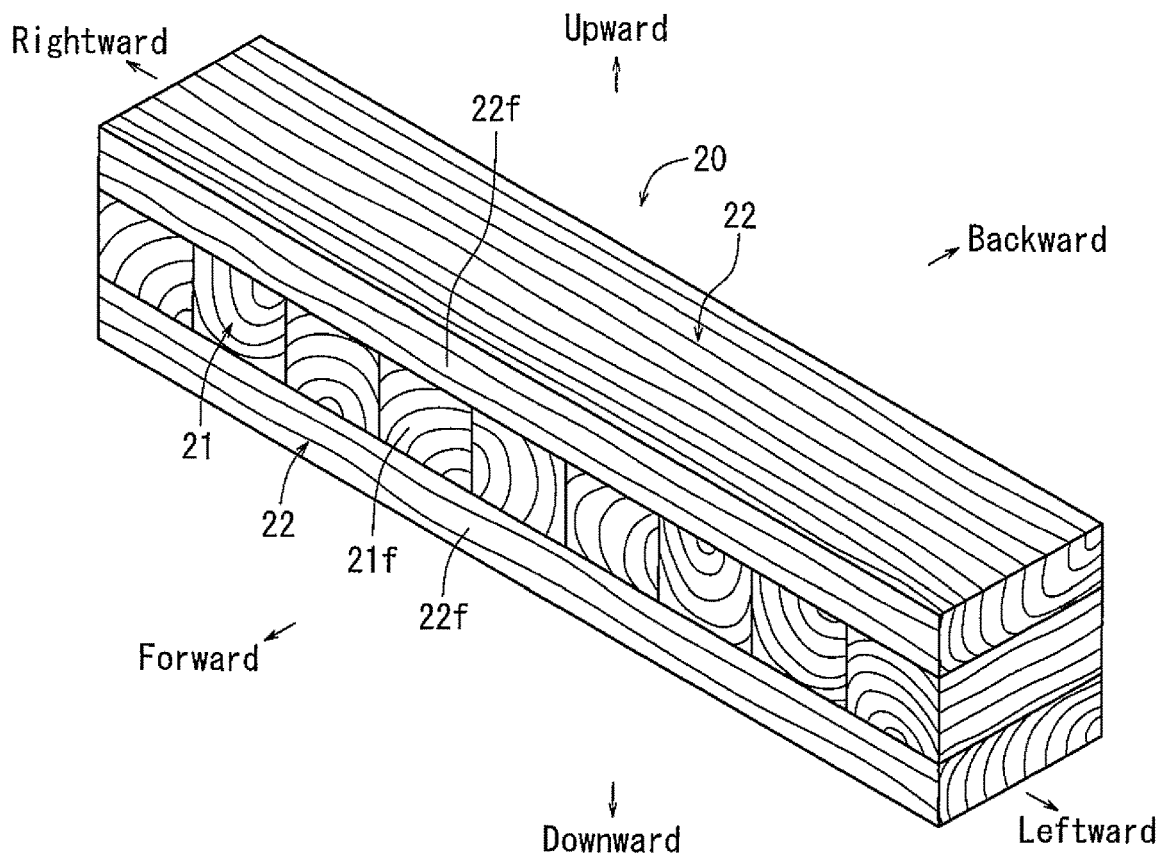
FIG. 8 is a schematic perspective view of a shock-absorbing member according to a Modified Embodiment 2.
Figure 9:
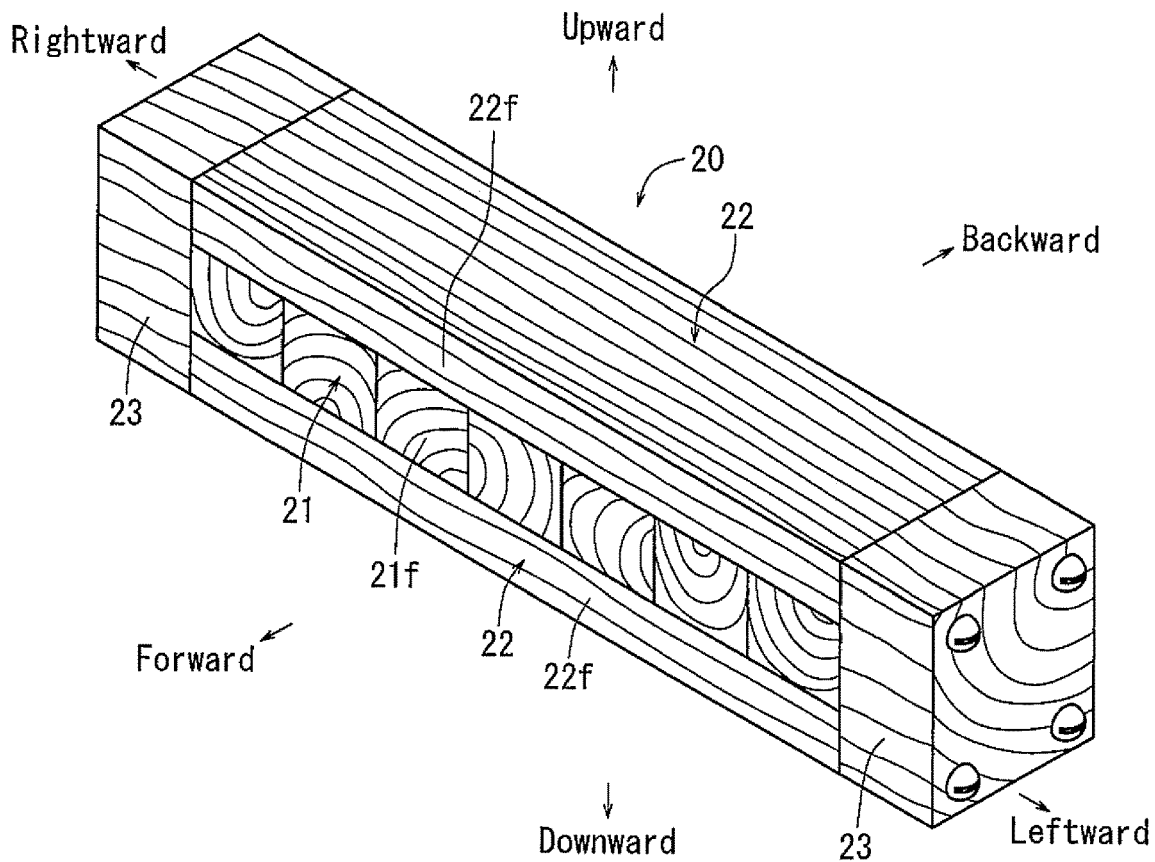
FIG. 9 is a schematic perspective view of a shock-absorbing member according to a Modified Embodiment 2.

In the embodiment, the load input surfaces 21f of the large number of shock-absorbing wood members 21 to which the collision load F is input may be positioned so as to be displaced inward by the dimension L relative to the load input surfaces 22f of the pair of upper and lower supporting wood members 22 to which the collision load F is input. However, as shown in FIG. 8, in cases where the shock-absorbing member 20 needs not be collapsed in two stages, the load input surfaces 21f of the shock-absorbing wood members 21 to which the collision load F is input may be configured to be flush with the load input surfaces 22f of the pair of upper and lower supporting wood members 22 to which the collision load F is input. Further, as shown in FIG. 9, the large number of shock-absorbing wood members 21 may be additionally sandwiched between and held by a pair of right and left restraining wood members 23 in addition to the pair of upper and lower supporting wood members 22.

Figure 10:
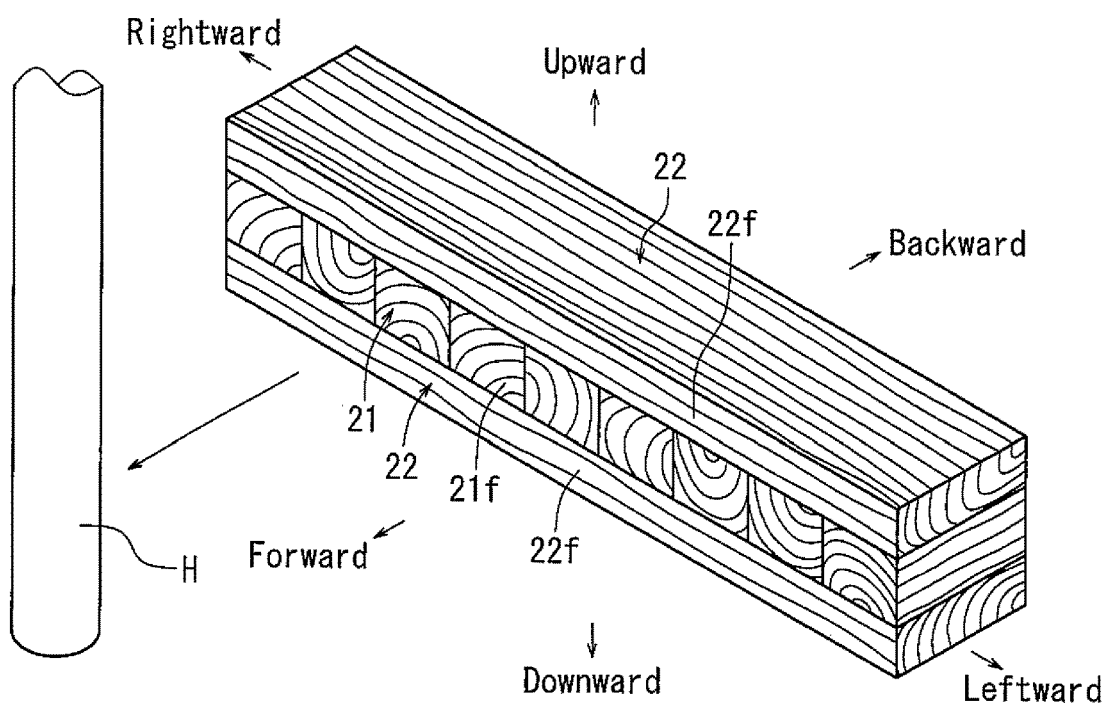
FIG. 10 is a schematic perspective view of the shock-absorbing member according to a Modified Embodiment 2 showing how a collision load may be locally applied thereto.
Figure 11:
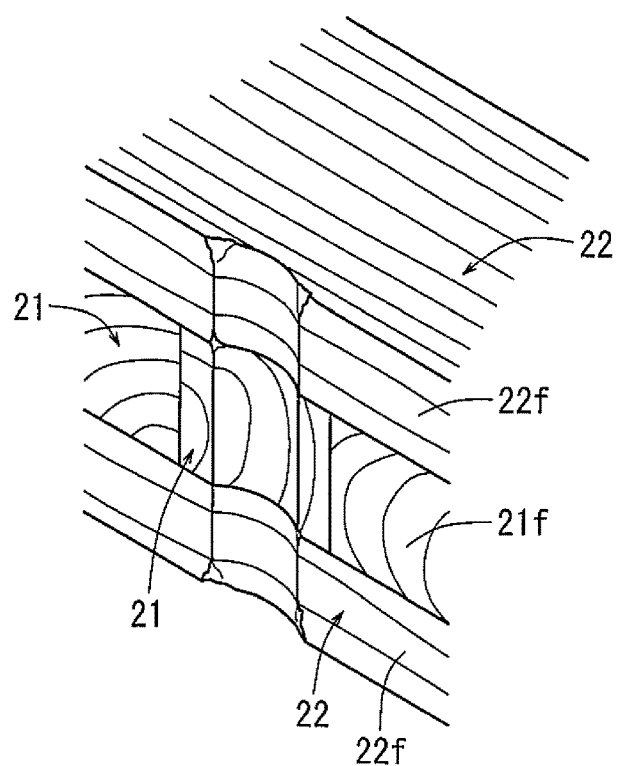
FIG. 11 is a schematic perspective view of the shock-absorbing member showing how the shock-absorbing member may be deformed by the collision load.
Figure 12:
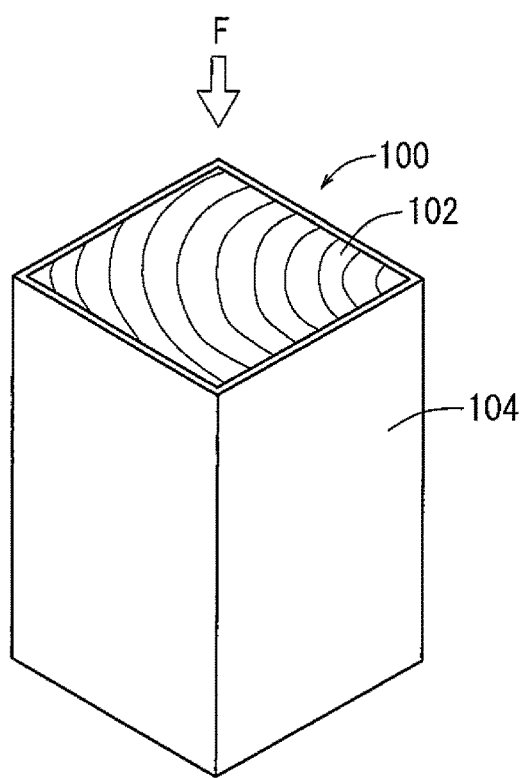
FIG. 12 is a schematic perspective view of a conventional shock-absorbing member.

FIG. 10 schematically shows how the vehicle 10 having the shock-absorbing member according to a Modified Embodiment 2 may collide with the power pole H. Further, FIG. 11 schematically shows how the load input surfaces 22f of the shock-absorbing wood members 21 and the load input surfaces 22f of the pair of upper and lower supporting wood members 22 in the shock-absorbing member 20 may start to collapse due to collision.

In the embodiment, the shock-absorbing member 20 may be attached to the bumper reinforcement member 15. However, the shock-absorbing member 20 may be received in an internal space of each of rocker panels (side sills) positioned on lateral side edges of the vehicle 10 and extending in the vehicle front-back direction. Conversely, the shock-absorbing member 20 may be attached to a lower side of each of the rocker panels (the side sills) by bolting. In such cases, a collision load applied to the vehicle 10 at the time of a vehicle side collision can be absorbed by the shock-absorbing member 20.

The invention claimed is:

1. A vehicular shock-absorbing member configured to absorb a collision load applied to a vehicle by utilizing deformation of wood, comprising:
   a pair of upper and lower supporting wood members positioned on an end periphery of a vehicle body in a beam shape and configured such that outer surfaces thereof function as load input surfaces in which the collision load is received and that axes of annual rings thereof extend along the load input surfaces; and
   a shock-absorbing wood member arranged over a range from one end to the other end of the pair of upper and lower supporting wood members in their longitudinal direction and sandwiched between the supporting wood members in such a manner that an axis of annual rings thereof extends in a direction perpendicular to the load input surfaces of the supporting wood members, wherein the shock-absorbing wood member is configured such that a load input surface thereof in which the collision load is received is flush with the load input surfaces of the supporting wood members or displaced inward relative to the load input surfaces of the supporting wood members.

2. The vehicular shock-absorbing member as described in claim 1, wherein a plurality of rectangular columnar-shaped shock-absorbing wood members are sandwiched between the pair of upper and lower supporting wood members in a laterally aligned condition.

3. The vehicular shock-absorbing member as described in claim 1, wherein the load input surface of the shock-absorbing wood member is displaced inward relative to the load input surfaces of the supporting wood members by a predetermined dimension.

4. The vehicular shock-absorbing member as described in claim 1, wherein the shock-absorbing wood member is sandwiched between and held by a pair of restraining wood members from both sides of the supporting wood members in the longitudinal direction, and wherein the restraining wood members respectively have annual rings of which axes are identical with the axes of the annual rings of the supporting wood members.

5. The vehicular shock-absorbing member as described in claim 4, wherein the pair of restraining wood members respectively have depression surfaces continuous with the load input surface of the shock-absorbing wood member.

6. The vehicular shock-absorbing member as describe in claim 1, wherein the shock-absorbing wood member and the pair of upper and lower supporting wood members are configured to be attached to a bumper reinforcement member of the vehicle extending in a vehicle width direction.

7. The vehicular shock-absorbing member as describe in claim 1, wherein the shock-absorbing wood member and the pair of upper and lower supporting wood members are configured to be attached to each of rocker panels of the vehicle extending in a vehicle front-back direction.

* * * * *